United States Patent [19]

Shimada

[11] Patent Number: 4,968,376

[45] Date of Patent: Nov. 6, 1990

[54] BONDING DEVICE FOR MANUFACTURING VEHICLE SEAT

[75] Inventor: Makoto Shimada, Akishima, Japan

[73] Assignee: Tachi-S Co., Ltd., Tokyo, Japan

[21] Appl. No.: 166,533

[22] Filed: Mar. 10, 1988

[51] Int. Cl.[5] .......................... B29C 53/36; B30B 7/04

[52] U.S. Cl. .................................... 156/475; 100/232; 100/237; 156/580

[58] Field of Search ............... 156/212, 214, 425, 500, 156/289, 213, 219, 220, 245, 483, 580, 581, 583.1, 583.8, 583.9, 583.91; 264/320, 322; 425/3 R, 4 R, 394, 817 R, 397; 297/458, 459, DIG. 1; 100/93 P, 232, 237

[56] References Cited

U.S. PATENT DOCUMENTS 2,746,514 5/1956 Warnken ............................ 156/581
2,937,689 5/1960 Peterson ........................ 156/216 X
3,325,329 6/1967 Bolesky .............................. 156/216
3,657,044 4/1972 Singer ................................ 156/212
3,953,273 4/1976 Faller ............................ 156/245 X
4,571,320 2/1986 Walker ............................... 425/397
4,648,934 3/1987 Kiss .................................... 156/224
4,718,153 1/1988 Armitage et al. ...................... 156/72
4,786,354 11/1988 Makino .............................. 156/538
4,818,331 4/1989 Shimada ............................. 156/475

*Primary Examiner*—Michael W. Ball
*Assistant Examiner*—Steven D. Maki
*Attorney, Agent, or Firm*—Browdy and Neimark

[57] ABSTRACT

A bonding device for manufacturing a vehicle seat, in which a foam cushion member secured on an upper die is pressed against a top cover member placed on a lower die for bonding those two members together. In the upper die, provided are main and auxiliary pressing mechanisms in such a manner that the cushion member is bodily pressed by the main pressing mechanism against the top cover member and then additionally pressed by the auxiliary pressing mechanism at a local area of the cushion member where a pressure of the main pressing mechanism is not sufficiently applied. In this way, the top cover member is positively bonded to the cushion member.

6 Claims, 3 Drawing Sheets

BONDING DEVICE FOR MANUFACTURING VEHICLE SEAT

BACKGROUND OF THE INVENTION

1. Field of the Invention

The present invention relates to a bonding device for manufacturing a vehicle seat such as an automotive seat, and particularly relates to an improvement of a bonding device for bonding a top cover member to an unvenly-shaped surface of a foam cushion member (made of urethane foam material).

2. Description of the Prior Art

In a conventional process for manufacturing a vehicle seat, bonding a top cover member to a foam cushion member is effected by such bonding device as shown in FIG. 1 so as to provide a seat shown in FIG. 2. According to this prior art device, lowering and pressing of an upper die (a'), on which a foam cushion member (1) is secured, against a top cover member (2) placed on a lower die (b) so that the top cover member (2) is bonded to the cushion member (1) via an adhesive.

But, the fact that the cushion member (1) is formed unevenly on its upper surface as in FIG. 2, namely, formed with a raised bolster portion (11) at its both sides, a central portion (12) defined between the raised bolster portions (11), and a recessed groove (13) at the top of each bolster portion (11), creates a difficulty in neatly bonding the top cover member (2) to the upper surface of cushion member (1) and, in particular, at the recessed grooves (13), which serve to produce decorative dents **(2*a*) on the top cover member (2) for aesthetic purpose, the complete bonding of the cover member (2) thereinto is not practically effected, increasing the possibility that the corresponding portions of cover member (2) will be easily peeled from the recessed grooves. (13). This difficulty arises from a poor pressure distribution caused by the thickness variations in the cushion member (1). That is, the central portion (12), whose thickness is relatively thin, is applied a pressure from the upper die (a') at a sufficient degree to be bonded with the corresponding portion of the top cover member (2), but the raised bolster portions (11), whose thickness is much greater than the central portion (12), is not sufficiently applied the pressure from the upper die (a'), as a result of which their corresponding portions of the cover member (2) are not fully bonded to the bolster portions (11). The same applies for the respective inner lateral surfaces (14) of the bolster portions (11), and particularly applies in the case where the inner lateral surfaces (14)** extend substantially in alignment with the direction of the pressure applied thereto by the upper die (a').

SUMMARY OF THE INVENTION

In view of the above-mentioned problems of of conventional device, it is a purpose of the present invention to provide an improved bonding device for manufacturing a vehicle seat, which permits a positive bonding of a top cover member to the area of a foam cushion member under in which conditions pressure is not sufficiently applied from an upper die during a process for pressing and bonding the top cover member to the cushion member by means of upper and lower dies.

In accomplishing such purpose, the present invention comprises a lower die for receiving a top cover member thereon, an upper die so adapted that a foam cushion member is secured thereupon, a main pressing mechanism provided in said upper die, the main pressing mechanism being adapted to apply a pressure to the entirety of the cushion member, and an auxiliary pressing mechanism provided in said upper die, the auxiliary pressing mechanism being adapted to apply a pressure to the local area of the cushion member where the pressure of the main pressing mechanism is not sufficiently applied.

Accordingly, in operation, the entire body of the cushion member is pressed by the main pressing mechanism against the top cover member, while the auxiliary pressing mechanism gives an additional pressure to the areas of the cushion member where a sufficient pressure is not applied from the main pressing mechanism, so that all required portions of the cushion member are pressed against the top cover member to such sufficient degree that those two members are fully bonded together. Thus, in accordance with the present invention, the top cover member is positively bonded to the cushion member in an assured manner.

In one aspect of the invention, the main pressing mechanism includes a cylinder adapted to move the upper die, and the auxiliary pressing mechanism comprises a cylinder, a pressure plate provided on the cylinder, and a hole perforated in the upper die, such that the pressure plate is moved through the hole of the upper die by operation of the cylinder.

In another aspect of the invention, the pressure plate of the auxiliary pressing mechanism is at its one end rotatably hinged to the hole of the upper die, so that the operation of the cylinder causes the pressure plate to rotate downwardly from the upper die.

In still another aspect of the invention, the upper die is formed in a configuration conforming to that of the rear of the cushion member and the lower die is of a configuration conforming to the that of the upper surface of the cushion member.

DETAILED DESCRIPTION OF PREFERRED EMBODIMENTS OF THE INVENTION

Figure 1:
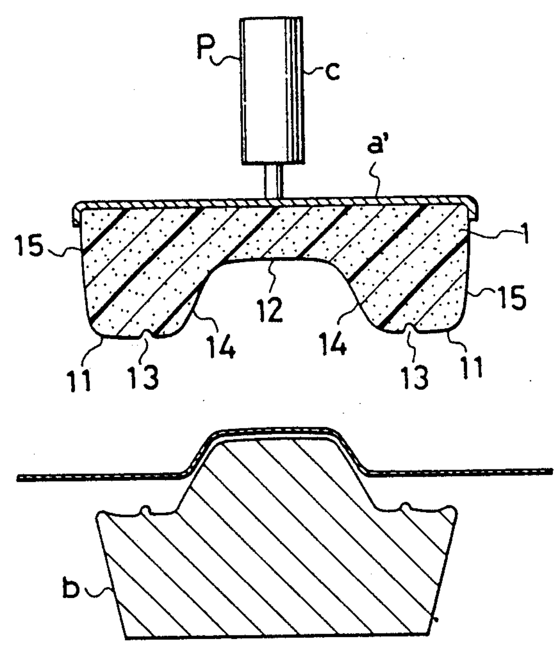
FIG. 1 is a sectional view of a conventional bonding device.
Figure 2:
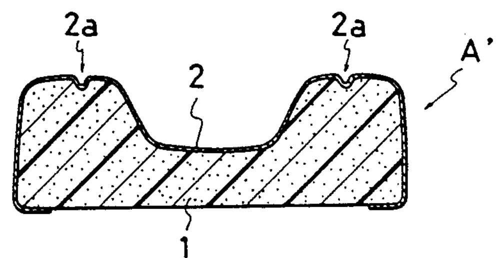
FIG. 2 is a sectional view of a resultant seat produced by the conventional bonding device.
Figure 3:
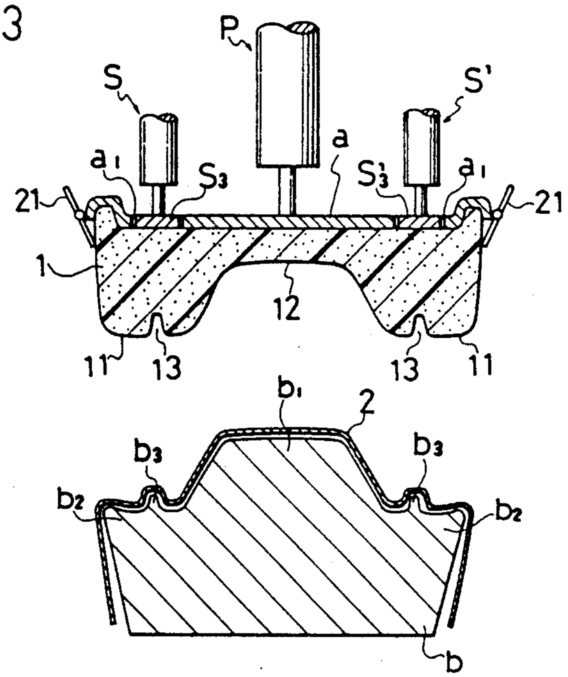
FIG. 3 is a sectional schematic view of a first embodiment of bonding device in accordance with the present invention.
Figure 4:
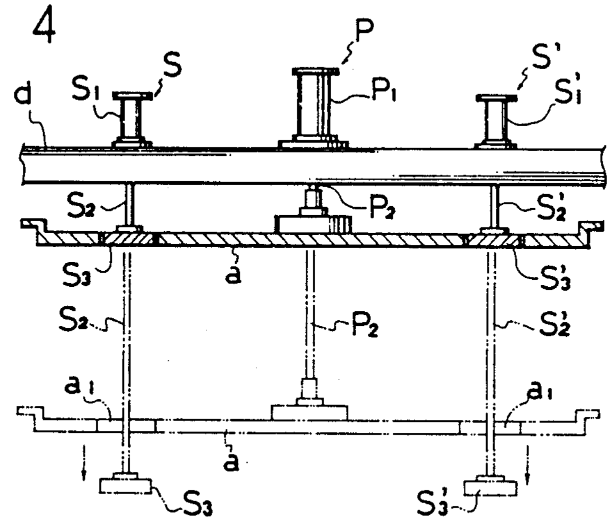
FIG. 4 is a sectional view of an upper die of the same first embodiment as in FIG. 3, showing schematically the state where the upper die is moved downwardly.

With reference to FIGS. 3 and 4, there is illustrated a first embodiment of the present invention, which will be described hereinafter.

Designations (a) and (b) represent an upper die and a lower die, respectively. The upper die (a) is at its upper side provided with a main pressing mechanism (P) so that the operation of the main pressing mechanisms (P) causes the vertical bodily movement of the upper die (a) relative to the lower die (b). A pair of auxiliary pressing mechanisms (S)(S') are arranged on the upper die (a) such that they are disposed on the opposite sides of the main pressing mechanism (S).

Specifically, the main pressing mechanism (P) comprises a hydraulic or pneumatic cylinder (P1) which is mounted on a support member (d) extended above the lower die (b), and a cylinder rod (P2) provided on the cylinder (P1) in a manner movable in its longitudinal direction, the forward end of the cylinder rod (P2) being fixed to the central portion of the upper die (a).

The auxiliary pressing mechanisms (S)(S') comprise, respectively, hydraulic or pneumatic cylinders (S1)(S'1) mounted on the support member (d), cylinder rods (S2)(S'2) provided on the cylinders (S1)(S'1) in a manner movable in their longitudinal directions, and pressure plates (S3)(S'3) each fixed to the respective forward ends of the cylinder rods (S2)(S'2).

In the upper die (a), there are perforated two holes (a1) in which the pressure plates (S3)(S'3) are normally respectively positioned in a registry manner, and when the cylinders (S1)(S'1) are operated, both pressure plates (S3)(S'3) are moved downwardly from or upwardly towards the holes (a1).

The upper die (a) is so adapted that a foam cushion member (1) is secured thereon by means of clamps (21) provided on the periphery of the upper die (a). The cushion member (1) is made by a urethane foam material, for example, and formed by foaming in a mold into a seat shape, such that its upper surface is formed with a recessed central portion (12), a pair of raised bolster portions (11) disposed on both sides of the central portion (12), and recessed grooves (13) defined in the respective top surfaces of the bolster portions (11). As shown, the flat rear surface of the cushion member (1) is secured on the upper die (1), with such unevenly formed upper surface of the cushion member (1) depending downwardly from the upper die (a) towards the lower die (b) which will be described specifically later.

It should be noted that in place of the clamps (21), other kinds of retaining means may be used, such as an electromagnet which is embedded in the upper die (a) and a metallic wire member embedded in the cushion member (1) so that the cushion member (1) is secured to the upper die (a) by means of electromagnetic force, for example.

The lower die (b) is formed in an uneven configuration such as to conform to the above-described uneven upper surface of the cushion member (1). Specifically, the lower die (b) is so formed at its upper surface that there are defined an upwardly projected portion (b1) centrally thereof in correspondence with the recessed central portion of the cushion member (1), a pair of low shoulder portions (b2) disposed at the foot areas of the upwardly projected portion (b1) in a manner corresponding respectively to the two raised bolster portions (11) of the cushion member (1), and a pair of protrudent portions (b3) each formed on the respective low shoulder portions (b2), the protrudent portions (b3) being disposed, respectively, at a point corresponding to the recessed grooves (13) of the cushion member (1).

Thus-constructed lower die (b) is adapted for receiving a top cover member (2) thereupon. In a practical operation, the top cover member (2) is turned inside out and then placed on the lower die (b). In this connection, although not shown in the drawings, in the case where the top cover member (2) is made of an air impermeable synthetic resin material (such as vinyl chloride), the lower die (b) may be formed hollow therein, with plural suction holes perforated in its upper surface and a type of an air suction device communicated with the hollow interior of the die (b) so that the top cover member (2) is secured to the lower die (b) by virtue of air suction force caused at the plural air suction holes. Or, in the case of the top cover member (2) being made of a thermoplastic synthetic resin material, a heating means may be provided within the lower die (b) so as to heat the top cover member (2) for softening the same to close contact with the lower die (B), to thereby secure the former to the latter.

Now, the operation of the above-described bonding device will be described as below.

After applying an adhesive to either or both of the bonding areas of the cushion member (1) and top cover member (2), the above-mentioned cylinder (P1) of the main pressing mechanism (P) is firstly operated to lower the upper die (a) towards the lower die (b) so that the cushion member (1) secured to the upper die (a) is bondily pressed against the top cover member (2) placed on the lower die (b).

Figure 5:
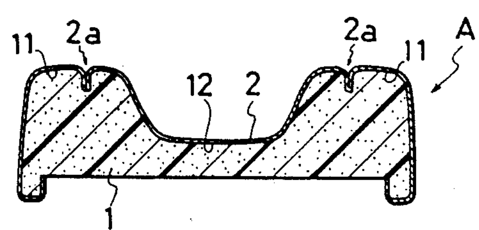
FIG. 5 is a sectional view of a resultant seat produced by the first embodiment of the present invention.

Next, the cylinders (S1)(S2) of the auxiliary pressing mechanism (S)(S') are operated to cause the downward movement of their respective cylinder rods (S2)(S'2) and thus the same movement of the pressure plates (S3)(S'3) in a direction away from the respective holes (a1) of the upper die (a). Consequently, the pressure plates (S3)(S'3) are displaced lower than the upper die (a) which presses the cushion member (1), as shown in the phantom line in FIG. 4, to thereby give a greater degree of pressure to both lateral areas in the rear of of the cushion member (1) which correspond, respectively, to the recessed grooves (13) as well as raised bolster portions (11) thereof, with the result that those grooves (13) and bolster portions (11) are pressed against the corresponding portions of the top cover member (2) positively, whereupon bonding is completely effected therebetween so as to produce a resulting seat (A) as shown in FIG. 5 in which decorative dents (2*a*) are neatly created on the top cover member (2) while both cushion and top cover members (1)(2) are fully bonded together without any insufficiently bonded portion therebetween.

Figure 6:
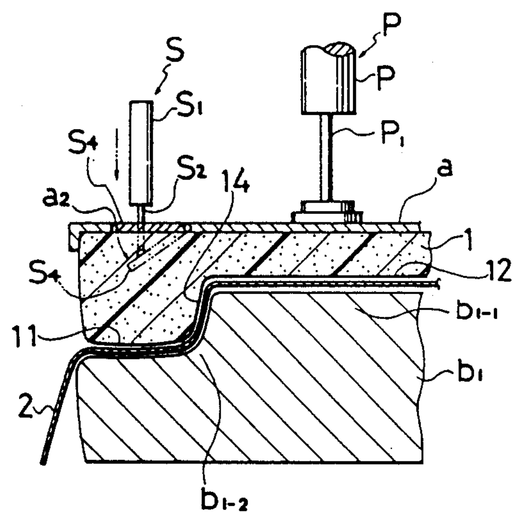
FIG. 6 is a partially broken sectional view of a second embodiment of the present invention.

FIG. 6 illustrates a second embodiment of the present invention, in which there is provided a hinged pressure plate (S4) on the upper die (a). According to this embodiment, the hinged pressure plate (S4) is hinged at its one end to a suitable area of the peripheral edge of the hole (a2) of the upper die (a) so that the plate (S4) is rotatable vertically about its hinged portion, and the forward end of the cylinder rod (S2) is so pivoted to the upper surface of the pressure plate (S4) as to permit the vertical rotation of the pressure plate (S4) in response to the vertical movement of the cylinder rod (S2). Thus, the downward movement of the cylinder rod (S2) causes the downward rotation of the pressure plate as shown in the phantom line and arrows in FIG. 6.

The present embodiment is designed for bonding to the top cover member (2) the cushion member (1) of such construction that the inner lateral surface (14) of the raised bolster portion (11) stands substantially in alignment with the direction of pressure applied by the upper die (4). Hence, there is provided another lower die (b1) comprising a projected central portion (b1-1) formed in a shape corresponding to the recessed central portion (12), and a low shoulder portion (b1-2) formed in a shape conforming to the inner surface (14) of the raised bolster portion (11) and the top portion thereof.

In operation, after pressing of the cushion member (1) in its entirety by operation of the main pressing mechanism (P), the hinged pressure plate (S4) is pushed downwardly by the cylinder rod (S2) of the cylinder (S1) of the auxiliary pressing mechanism (S) and rotated downwardly around its hinged portion to partly press the rear surface of the cushion member (1) in a direction towards the inner surface (14) of the raised bolster portion (11), so that a sufficient degree of pressure is applied through the hinged pressure plate (S4) to cause the positive contact of the inner surface (14) with the shoulder portion (b1-2). As a result, the inner surface of (14) of the bolster portion (11) is positively bonded to the corresponding portion of the top cover member (2).

Figure 7:
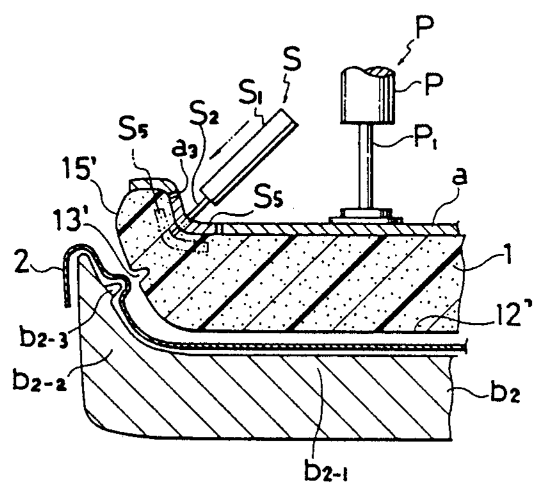
FIG. 7 is a partially broken sectional view of a third embodiment of the present invention.

FIG. 7 shows a third embodiment of the present invention, which is adapted to bond to the top cover member (2) such a cushion member (1') as having a tapered lateral surface (15'), a recessed groove (13') formed in the tapered lateral surface (15'), and a generally convex central portion (12').

For that purpose, the present embodiment is essentially composed of an upper die (a') of which lateral portion is formed in a curved manner conforming to the tapered lateral surface (15'), as illustrated, an inclined auxiliary pressing mechanism (S) to be explained later, and a lower die (b2) which comprises a recessed central portion (b2-1), an upwardly raised lateral portion (b2-2), and a protrusion (b2-3) formed on the inner surface of the upwardly raised lateral portion (b2-2). Each of those portions (b2-1) (b2-2)(b2-3) of the lower die (b2) is so formed as to conform in shape to the respective portions (12', 13', 15') of the cushion member (1').

The auxiliary pressing mechanism (S) in the embodiment is provided in a manner inclined towards the protrusion (b2-3) of the lower die (b2), having a substantially L-shaped pressure plate (S5) which is normally positioned in a hole (a3) perforated in the curved lateral portion of the upper die (a') such that the substantially L-shaped pressure plate (S5) lies in registry with the hole (a3). With this structure, after having pressed the cushion member (1') by operation of the main pressing mechanism (P), the auxiliary pressing mechanism (S) is operated so as to move the substantially L-shaped pressure plate (S5) from the hole (a3) in a direction towards the upwardly raised lateral portion (b2-2) of the lower die (b2), thereby pressing the tapered lateral surface (15') of the cushion member (1') against the inner surface of the upwardly raised lateral portion (b2-2) with the result that both tapered lateral surface (15') and recessed groove (13') are positively pressed and bonded to their corresponding portions of the top cover member (2).

From the description above, it will be seen that the entire body of the cushion member is pressed by the main pressing mechanism and the area of the cushion member where the pressure is not sufficiently applied is additionally pressed by the auxiliary pressing mechanism, against the top cover member, and therefore, a sufficient amount of pressure is applied to even a cushion member whose thickness is varied in its several parts, and the one having a portion lying substantially along the direction of pressure caused from the upper die. Accordingly, the top cover member is positively bonded to such kinds of cushion members, and there is eliminated any insufficiently bonded state between those two members, which permits production of neatly finished seat.

While having described the present invention as above, it should be understood that the invention is not limited to the embodiments illustrated but other replacements, modifications and additions may structurally be possible without departing from the spirit of the appended claims for the invention.

What is claimed is:

1. A bonding device for manufacturing a vehicle seat by which a top cover member is bonded to a resilient foam cushion member formed by foaming in a mold into a predetermined shape of the seat, said bonding device comprising:

a lower die on which said top cover member is placed, said lower die having an upwardly protrudent portion ($b_3$);

an upper die having means to secure said cushion member to said upper die, said upper die being movable towards said lower die so that said cushion member secured thereon is pressed against and bonded to said top cover placed on said lower die;

a main pressing mechanism provided on said upper die for moving said upper die a first distance toward said lower die to press an entire body of said cushion member, wherein said main pressing mechanism comprises a cylinder for moving said upper die in a direction towards and away from said lower die; and an auxiliary pressing mechanism provided on said upper die, said upper die having a hole therethrough, said auxiliary pressing mechanism having press means being adapted to pass through said hole in said upper die and press a local portion of said cushion member in a direction towards said lower die by moving a second distance greater than said first distance, said press means of said auxiliary pressing mechanism being disposed opposite said upwardly protrudent portion ($b_3$) of said lower die, wherein said auxiliary pressing mechanism comprises a cylinder, and wherein said press means comprises a pressure plate provided on said cylinder, wherein said upper die is vertically moved by said main pressing mechanism relative to said lower die and said auxiliary pressing mechanism is disposed in a manner inclined relative to said upper die so that said pressure plate thereof is moved in an inclined direction relative to said upper die, whereby said top cover member is bonded to said cushion member by means of a pressure applied by said main and auxiliary pressing mechanism.

2. A bonding device for manufacturing a vehicle seat by which a top cover member is bonded to a resilient foam cushion member formed by foaming in a mold into a predetermined shape of the seat, said bonding device comprising:

a lower die on which said top cover member is placed;

an upper die having means to secure said cushion member to said upper die, said upper die being movable towards said lower die so that said cushion member secured thereon is pressed against and bonded to said top cover placed on said lower die;

a main pressing mechanism provided on said upper die for moving said upper die a first distance toward said lower die to press an entire body of said cushion member; and an auxiliary pressing mechanism provided on said upper die, said upper die having a hole therethrough, said auxiliary pressing mechanism having press means being adapted to pass through said hole in said upper die and press a local portion of said cushion member in a direction towards said lower die by moving a second distance greater than said first distance, said press means of said auxiliary pressing mechanism having an end thereof pivotably hinged to a periphery of said hole of said upper die, whereby said top cover member is bonded to said cushion member by means of a pressure applied by said main and auxiliary pressing mechanism.

3. The bonding device according to claim 2 wherein said main pressing mechanism comprises an hydraulic or pneumatic cylinder for moving said upper die in a direction towards and away from said lower die, and wherein said auxiliary pressing mechanism comprises a cylinder, and wherein said press means comprises a pressure plate provided on said cylinder.

4. The bonding device according to claim 2, wherein said cushion member is formed with a pair of raised bolster portions at is both sides and a central portion defined between said pair of raised bolster portions, and wherein said main pressing mechanism is disposed at a point corresponding to said central portion of said cushion member and said auxiliary pressing mechanism is arranged on opposite sides of said main pressing mechanism, thereby providing two auxiliary pressing mechanisms each being disposed at a point corresponding to the respective said pair of raised bolster portions of said cushion member.

5. The bonding device according to claim 2, wherein said press means of said auxiliary pressing mechanism conforms in shape to that of a rear part of said cushion member.

6. A bonding device for manufacturing a vehicle seat by which a top cover member is bonded to a resilient foam cushion member formed by foaming in a mold into a predetermined shape of the seat, said bonding device comprising:

a lower die on which said top cover member is placed, said lower die having an upwardly protrudent portion ($b_3$);

an upper die having means to secure said cushion member to said upper die, said upper die being movable towards said lower die so that said cushion member secured thereon is pressed against and bonded to said top cover placed on said lower die;

a main pressing mechanism provided on said upper die for moving said upper die a first distance toward said lower die to press an entire body of said cushion member; and an auxiliary pressing mechanism provided on said upper die, said upper die having a hole therethrough, said auxiliary pressing mechanism having press means being adapted to pass through said hole in said upper die and press a local portion of said cushion member in a direction towards said lower die by moving a second distance greater than said first distance, said press means of said auxiliary pressing mechanism being disposed opposite said upwardly protrudent portion ($b_3$) of said lower die, wherein said pressure plate of said auxiliary pressing mechanism is at its one end pivotably hinged to a periphery of said hole of said upper die, whereby said top cover member is bonded to said cushion member by means of a pressure applied by said main and auxiliary pressing mechanism.

* * * * *